United States Patent [19]
Gadzinski

[11] Patent Number: 5,692,909
[45] Date of Patent: Dec. 2, 1997

[54] TRANSMISSION MOLDED ELECTRICAL CONNECTOR SYSTEM

[75] Inventor: Steven A. Gadzinski, Sterling Heights, Mich.

[73] Assignee: Ford Global Technologies, Inc., Dearborn, Mich.

[21] Appl. No.: 597,065

[22] Filed: Feb. 5, 1996

[51] Int. Cl.$^6$ ............................................. H01R 33/00
[52] U.S. Cl. ............................................. 439/34; 174/72 A
[58] Field of Search ............................ 439/34, 130, 507, 439/510; 174/72 A

[56] References Cited

U.S. PATENT DOCUMENTS 5,174,110  12/1992  Duesler et al. ........................ 439/34

*Primary Examiner*—Neil Abrams
*Assistant Examiner*—Eugene G. Byrd
*Attorney, Agent, or Firm*—Peter Abolins

[57] ABSTRACT

An electrical connector assembly for an automatic transmission includes electrical conductors which are positioned by the cooperation of integral mounting protrusions extending from an insulating frame and engaging an oil pan associated with of the transmission housing. The electrical conductors contained within the electrical connector assembly housing are electrically isolated from one another, securely positioned to prevent electrical interference with one another, and relatively easily removed facilitating replacement of components.

11 Claims, 5 Drawing Sheets

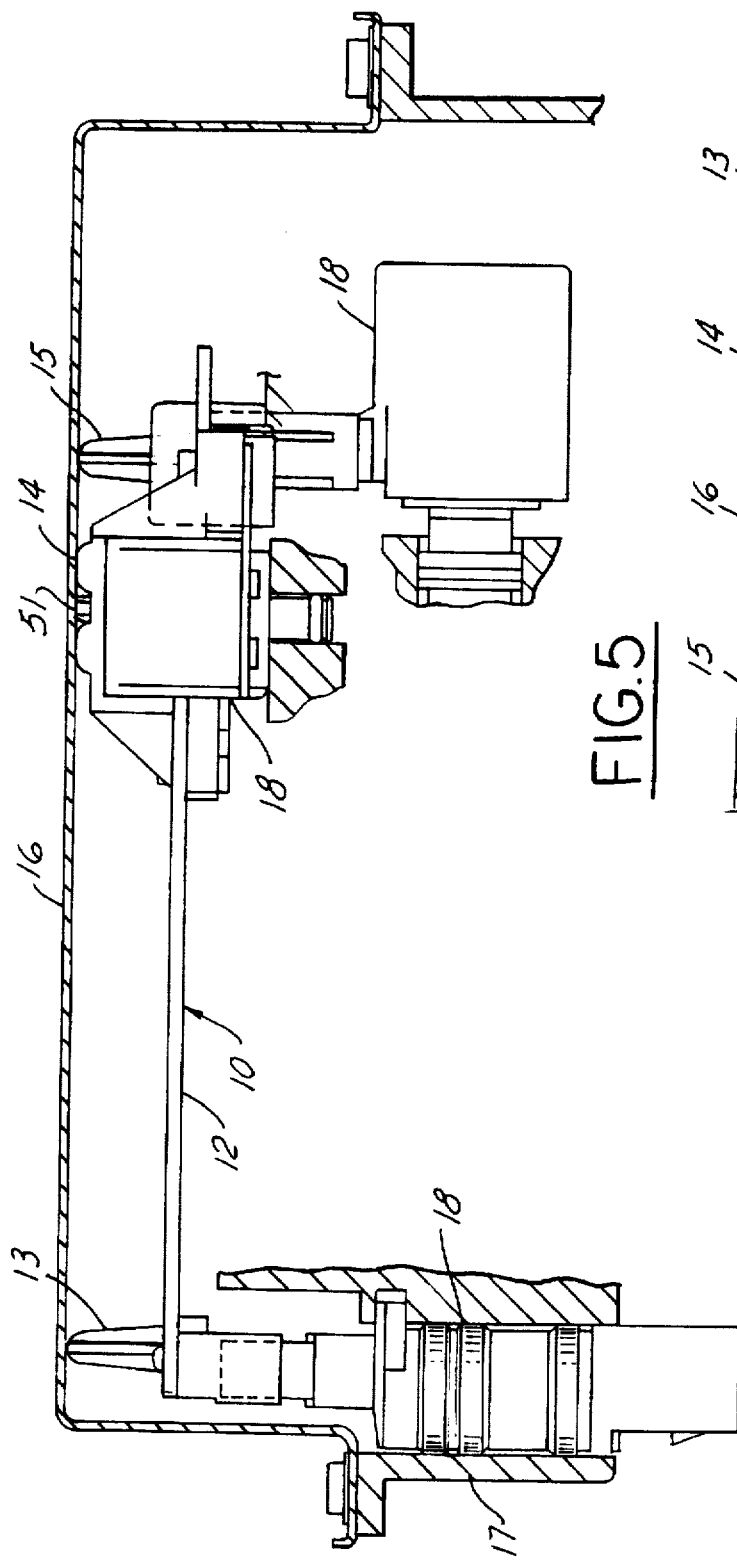
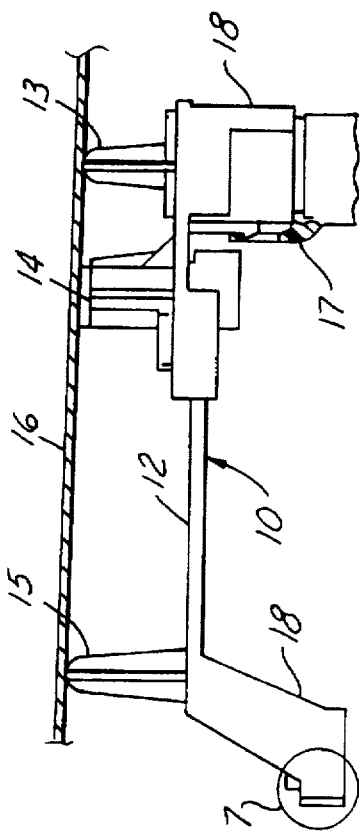
FIG. 5
FIG. 6
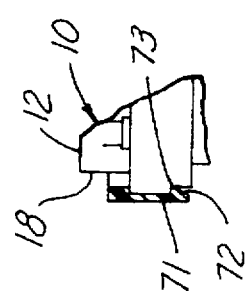
FIG. 7

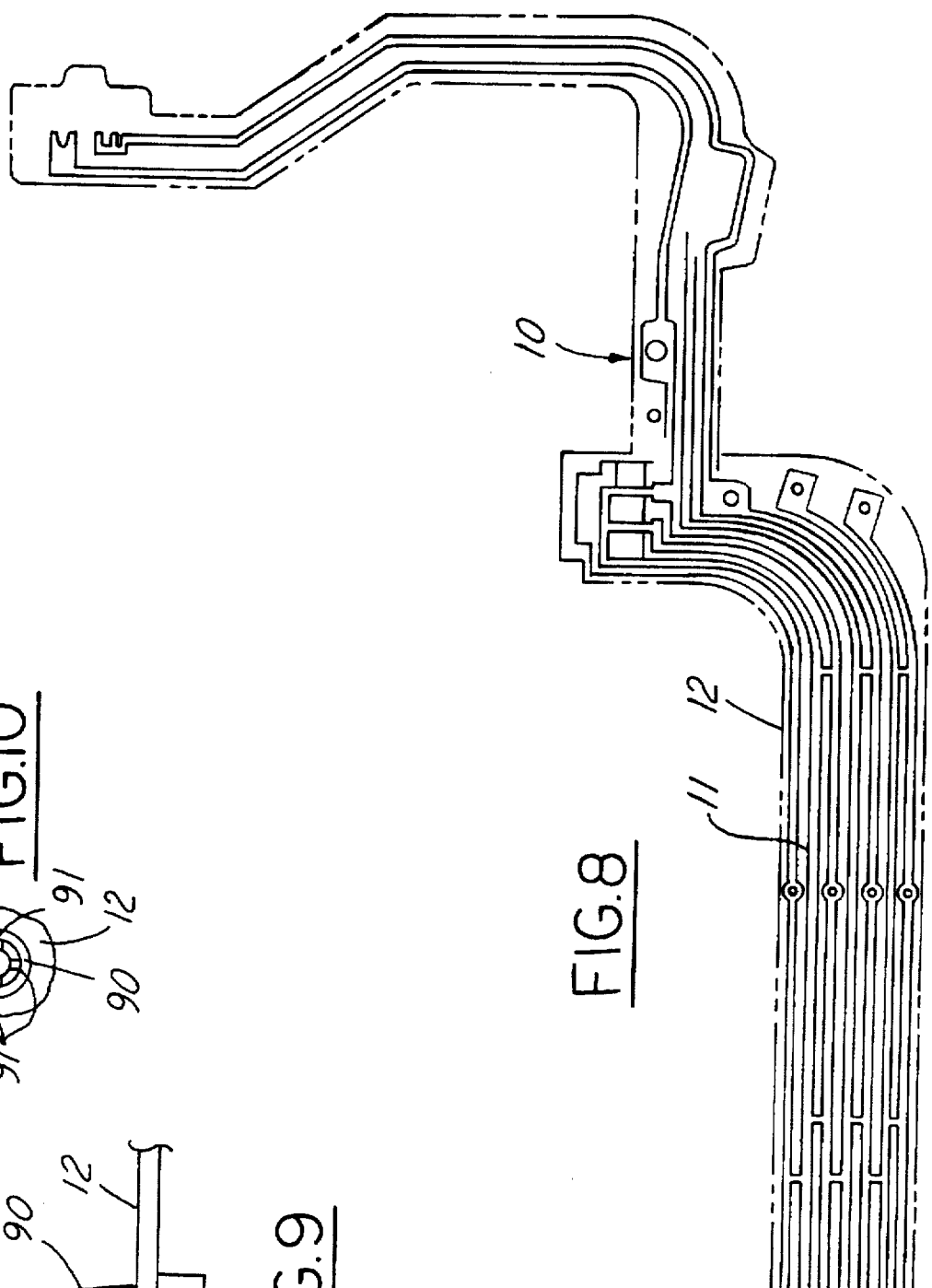

TRANSMISSION MOLDED ELECTRICAL CONNECTOR SYSTEM

BACKGROUND OF THE INVENTION

1. Field of the Invention

This invention relates to electrical conduction paths in automotive transmissions.

2. Prior Art

It is known to use insulated wires which are placed within the housing of a transmission to conduct various electrical signals used for operating the transmission. The disadvantages of such an insulated electric wires include the fact that they may catch, wear, tear, shred and short. Thus, the loose wires may catch on conveyor system for moving the transmission assembly. A wire bulkhead assembly may become pinched during transmission assembly causing an electrical short to ground. Any loose and limp wires can become hooked and damaged during transmission assembly.

It is also known to use thicker rod-like runs of electrical conductor which are more robust and do not bend as easily. However, such conductors are more susceptible to shorting by having metal particles from the transmission land across them. Further, it is known to use printed circuit boards within the transmission housing to protect the wire conductors.

Known configurations also include the use of connectors at the end of loose wire harnesses. However, such connectors may not be seated properly to an electrical receptacle to form an uninterrupted conduction path. More specifically, the electrical connectors may not lock thereby being vulnerable to disconnection during transmission assembly. The connection of components such as solenoids, temperature sensors and temperature sensor retainers, may require an undesirably large number of separate motions. A temperature sensor may be a discreet and separate component. Such a configuration has the disadvantage of requiring extra assembly steps and the possibility for error at each assembly step. Furthermore, with wires having crimped terminals, the potential exists for a miscrimp. Still further, the vehicle harness at the exterior of the transmission may require a three wire splice thereby becoming a potential for water ingression.

Such known electrical connection configurations have various combinations of the above discussed drawbacks. These are some of the problems this invention overcomes.

SUMMARY OF THE INVENTION

This invention provides an electrical connector assembly which is automatically held in place in a properly assembled configuration by the assembly of the transmission housing and oil pan. A locking apparatus and mounting protrusion of the electrical connector assembly guarantees the connector assembly is correctly positioned and firmly secured when the oil pan and the transmission housing are assembled. Further, the electrical conductors contained within the connector assembly are electrically isolated from one another, by an insulating cover and have a reduced likelihood of being shorted by floating metal particles.

The connector assembly is relatively easily removed facilitating replacement of components. There is no need for additional soldering and there is no likelihood of forgetting to make a connection. During assembly, the connector assembly eliminates wires hanging over the transmission pan rail during valve body installation. As a result, there are in-plant manufacturing cost savings due to wire elimination, plant testing, process and handling. In summary, if the housing is assembled, the connector assembly is automatically in the proper place.

In accordance with an embodiment of this invention, a connector assembly eliminates all wires thereby avoiding pinched wire shorts to ground. Further, all internal connections to solenoids are obtained during assembly. The primary lock for such electrical connections is the oil pan thereby making all internal electrical connections secure. Also, it is possible to use a solid terminal pin design which significantly reduces and may eliminate oil leakage out of the transmission housing. With a wire harness it was necessary to use a formed terminal which had the shortcoming of wicking transmission fluid out of the transmission. All electrical connections to the solenoids, temperature sensor, and external connections are accomplished with the same action. Wire crimps are eliminated and therefore terminal miscrimps are eliminated.

Further, advantageously, any discreet temperature sensor is eliminated. Instead, a temperature sensor is integrated into the connector assembly and can be a protected glass bead located near the transmission solenoids. Further, a connector assembly design in accordance with an embodiment of this invention provides a thicker electrical conductor and the capability for a single power lead daisy chain design. Such a design is advantageous because only a single power lead for the transmission is necessary. Still further, the connector assembly eliminates insert molding of terminated wire leads into plastic and associated manufacturing problems.

BRIEF DESCRIPTION OF THE DRAWINGS

FIG. 5 is a cross-section view of an electrical connector assembly mounted to another electrical connector and held in place by an oil pan of a transmission housing;

FIG. 6 is a cross-section view of the connection of the electrical connector assembly with another electrical connector and associated latch;

FIG. 7 is an enlarged view of the latch of FIG. 6 showing a cross-section of a tab engaging a locking ledge;

FIG. 8 is a plan view of a connector assembly in accordance with an embodiment of this invention;

FIG. 9 is a side, partly cross-section, view of a mounting protrusion with a collapsible top; and FIG. 10 is a plan view of the mounting protrusion of FIG. 9.

DETAILED DESCRIPTION OF THE INVENTION

Figure 1:
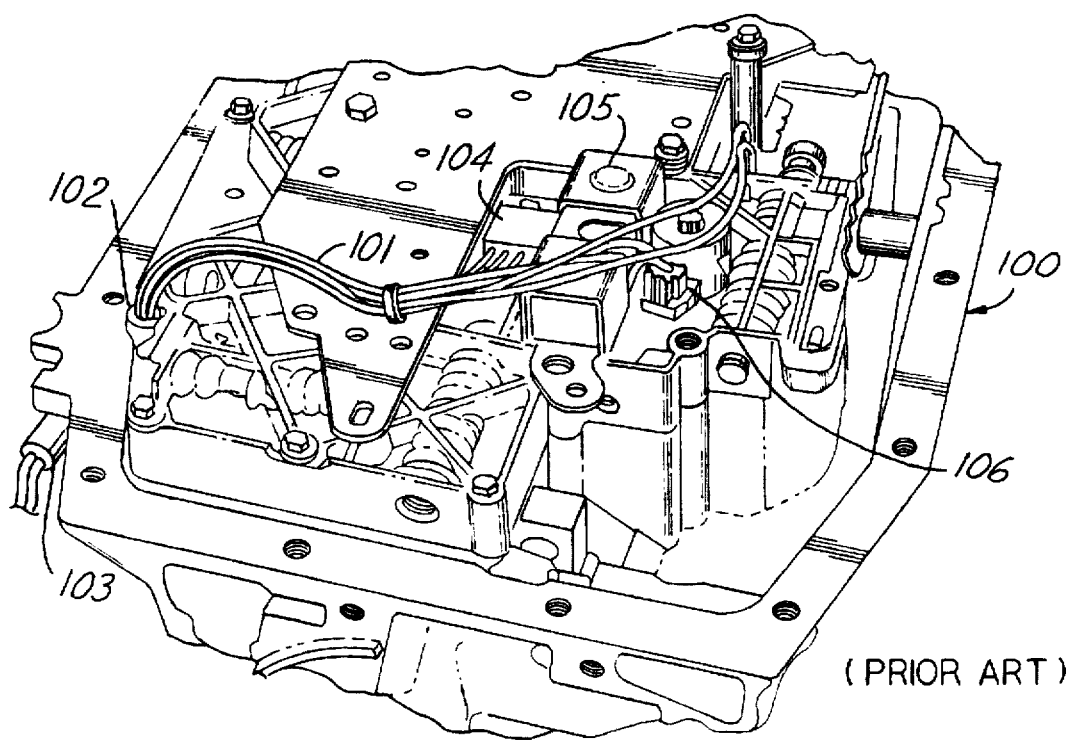
FIG. 1 is a perspective view of a connector assembly and transmission in accordance with the prior art.
Figure 2:
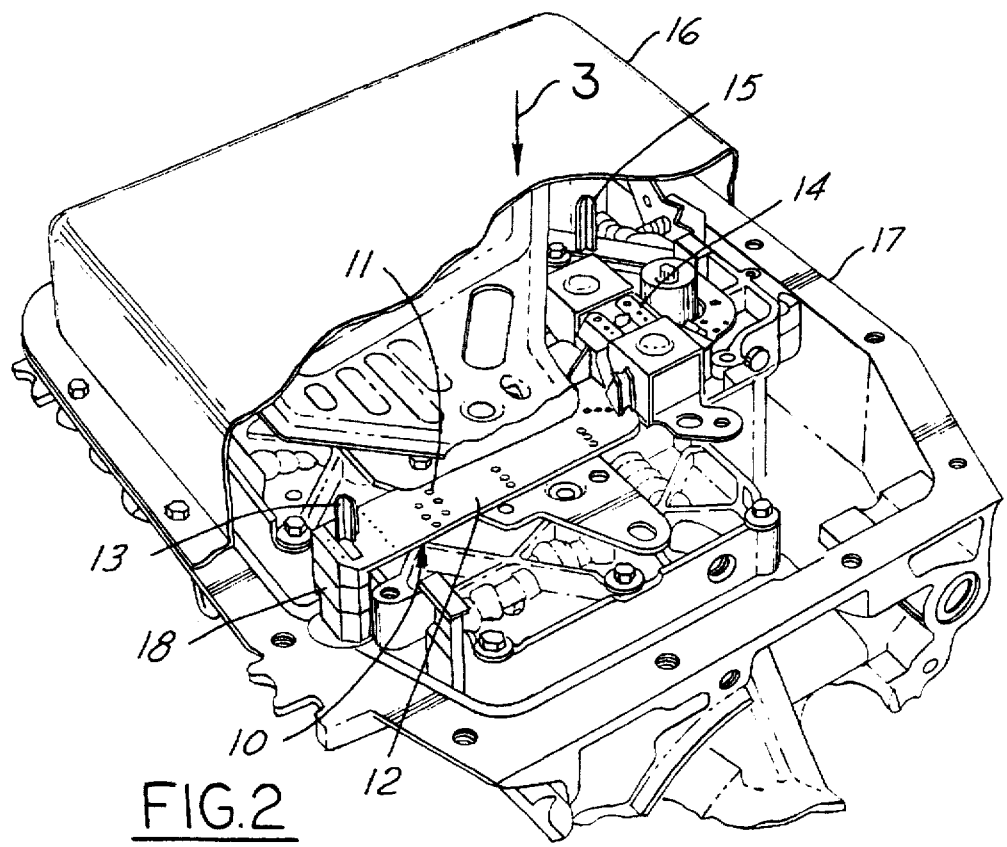
FIG. 2 is a perspective view of a transmission housing with a connector assembly in accordance with the embodiment of this invention.
Figure 3:
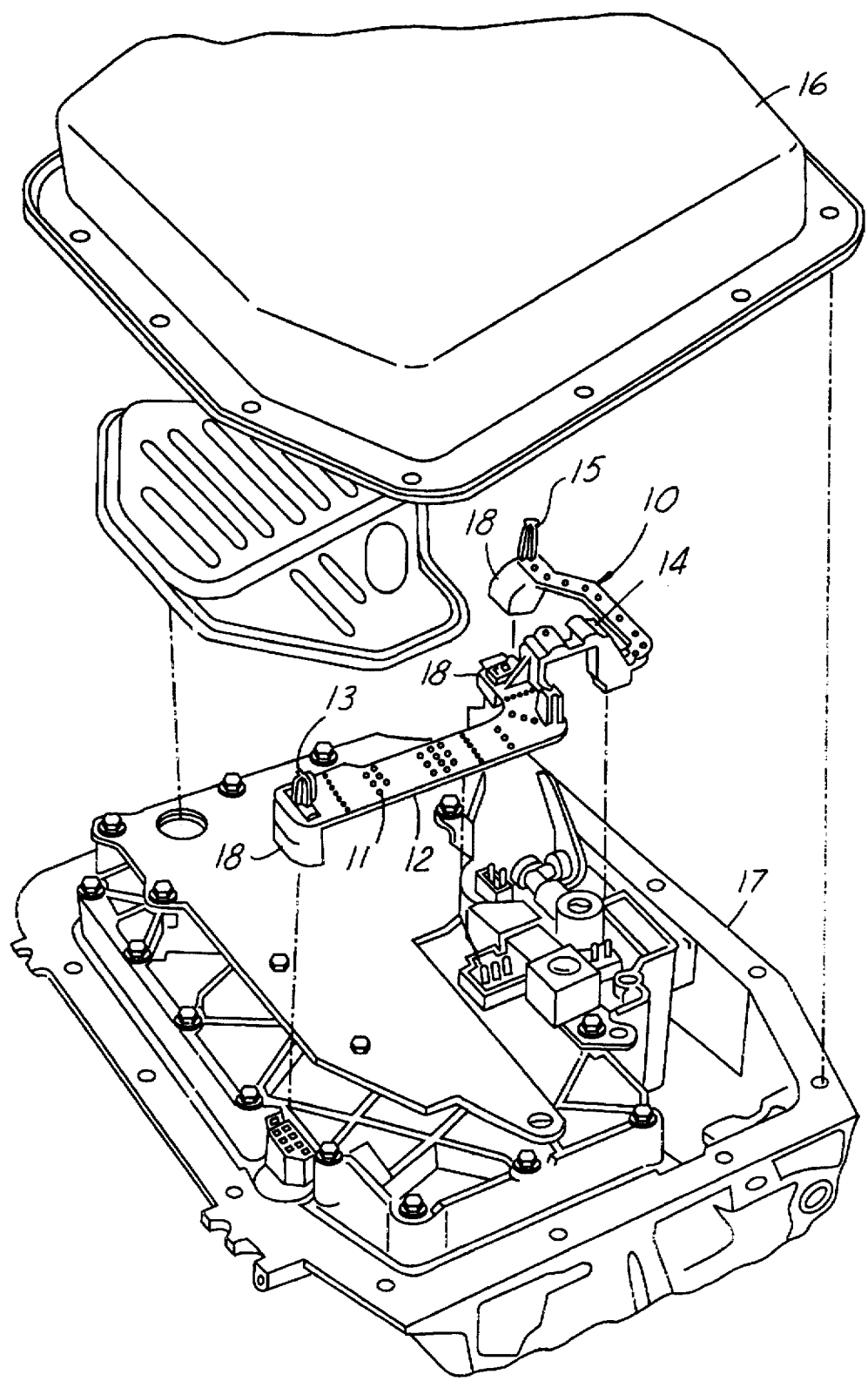
FIG. 3 is an exploded perspective view of an oil pan and transmission housing in accordance with an embodiment of this invention.
Figure 4:
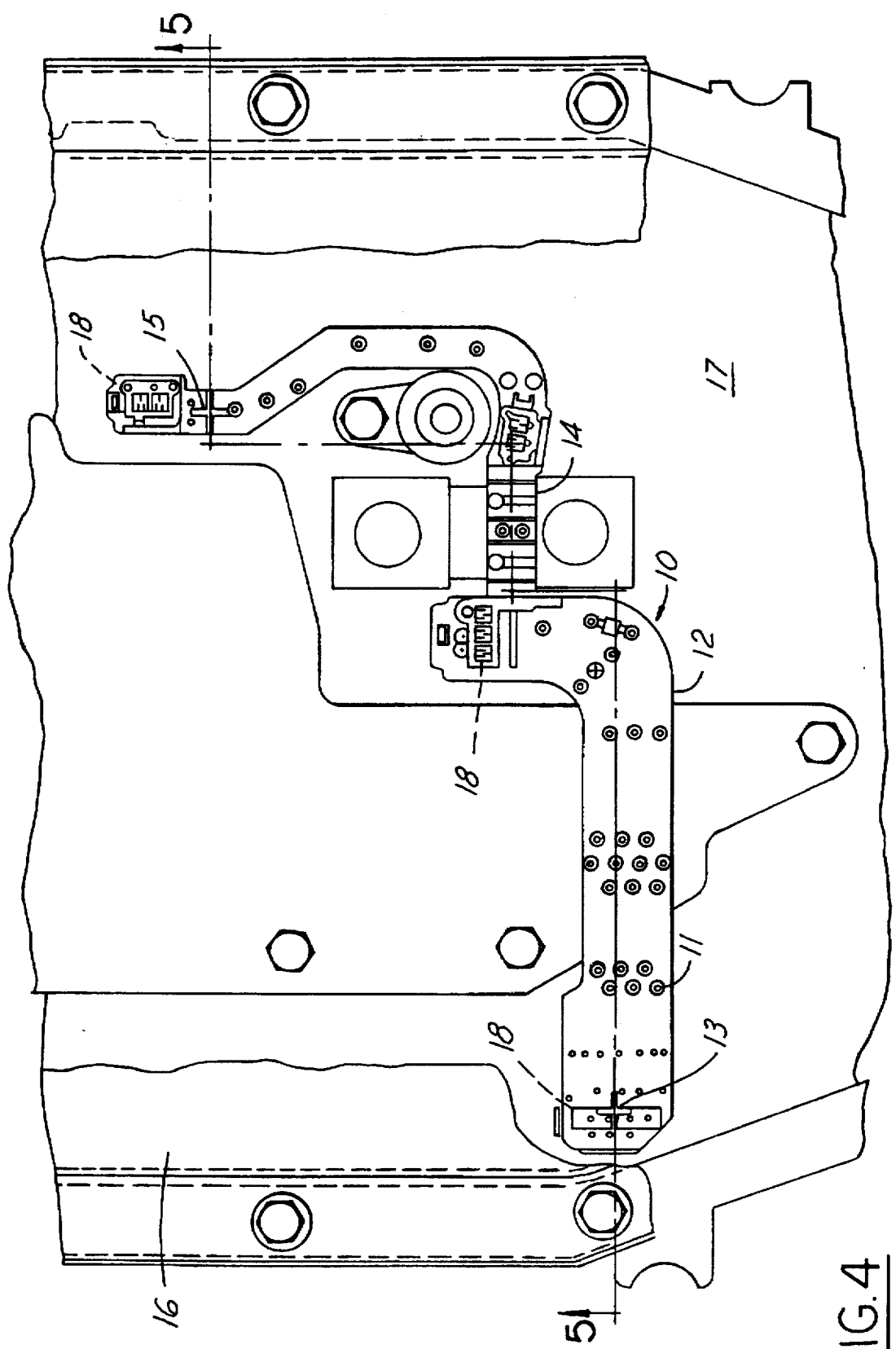
FIG. 4 is a plan view of a connector assembly mounted in a transmission housing in accordance with an embodiment of this invention.

Referring to FIG. 1, a prior art transmission assembly 100 includes a wire harness 101 extending from an electrical connector 102 adapted to fit an electrical receptor 103. Wire assembly 101 also includes a connector 104 for coupling to a solenoid 105, and a connector 106 for coupling to a thermister. The wires of wiring harness 101 are subject to being caught by a conveyor system during assembly. Also, connectors 102, 104 and 106 have to be individually coupled to a receiving electrical connector. Thus, there is always the possibility that such a coupling will not take place or that coupling will be incomplete and will come apart during further assembly of the transmission or during use of the transmission.

Referring to FIGS. 2, 3, 4, 5, 6 and 8, an electrical connector assembly 10 includes an electrical conductor run 11 within an insulating frame 12. Extending from insulating frame 12 are mounting protrusions 13, 14 and 15 which engage an oil pan 16 which is coupled to a transmission housing 17. Electrical conductor run 11 terminates at electrical connectors 18.

Advantageously, two types of electrical connector locks are used to serve electrical connectors 18 with the mounted components. First, a locking connection which requires a positive release of an overhanging arm is used in connection with the electrical connection through the bulkhead. Second, an electrical lock having a retaining force but which can be overcome in either direction, both in a locking and an unlocking direction, is used in connection with components which may have to be removed because of troubleshooting or maintenance of the transmission.

Referring to FIG. 7, an overhanging locking arm 71 has a protrusion 72 for engaging a ledge 73 of insulating frame 12. Depending upon the angle of protrusion 72 it can be released with respect to ledge 73 by a simple longitudinal force along the path of insertion or requires a force perpendicular to the direction of insertion to lift away arms 71 from ledge 73 thereby permitting removal.

Referring to FIG. 5, a thermister 51 is an integral part of electrical connector assembly 10. Thus, it is not necessary to have a separate thermister which is separately mounted and requires additional assembly to the wire harness. As shown, the thermister is directly mounted on connector assembly 10. No separate overmold or plastic housing is required.

Mounting protrusions 13, 14 and 15 extend from insulating frame 12 and are contacted by oil pan 16 to perform the function of providing reliable electrical connection by applying pressure to insulating frame 12 which urges electrical connectors 18 toward receiving electrical connections of other components.

In some embodiments it may be desired to compensate for stack up tolerances of insulating frame oil pan 16 and transmission components. This is done using a collapsible dome or portion at the end of the mounting protrusion so that, if mounting protrusion 13, 14 and 15 extends beyond the seated position of oil pan 16, it can be compressed or deformed to achieve the desired spacing. That is, the oil pan 16 can be secured in a closed position while electrical connectors 18 are in a locked condition.

More specifically, referring to FIG. 9, a mounting protrusion 90 extends from insulating frame 12 and has tongs 91 at its upper end which can be deflected or deformed to achieve a desired spacing when oil pan 16 presses down on tabs 91. FIG. 10 shows a plan view of the four mounting protrusions 91 which form.

Various modifications and combinations will no doubt occur to those skilled in the various arts to which this invention pertains. Such modifications and variations which basically rely on the teachings through which this disclosure has advanced the art are properly considered to be within the scope of this invention.

What is claimed:

1. An electrical connector assembly for an automatic transmission having a transmission housing and an oil pan, said connection apparatus including:

an elongated insulating member having contained therein elongated electrical conductors, electrical connectors being connected to said electrical conductors for mating with other components of the transmission;

mounting protrusions extending from said insulating member for engaging the transmission housing and the oil pan so that when the oil pan is coupled to the transmission housing the connector assembly is urged into a desired position to provide mechanical mounting and electrical connection, said mounting protrusion being leg-like protrusions extending from the elongated insulating member and being pressed by the oil pan as installed so as to push on said electrical connectors and make an electrical connection; and a locking means for coupling said electrical connectors of the electrical connector assembly to an electrical component of the transmission.

2. An electrical connector assembly for an automatic transmission as recited in claim 1 wherein said electrical component is a solenoid.

3. An electrical connector assembly for an automatic transmission as recited in claim 1 wherein the electrical component is an external connection through the transmission housing.

4. An electrical connector assembly for an automatic transmission as recited in claim 3 further comprising an integral support for a temperature sensor.

5. An electrical connector assembly for an automatic transmission as recited in claim 1 wherein said mounting protrusion includes a longitudinally adjustable end portion.

6. An electrical connector assembly for an automatic transmission as recited in claim 5 wherein said longitudinally adjustable end portion is a crushable dome portion.

7. An electrical connector assembly for an automatic transmission as recited in claim 4 wherein said locking means can be inserted using a longitudinal force in the direction of insertion travel.

8. An electrical connector assembly for an automatic transmission as recited in claim 7 wherein said locking means can be removed using a longitudinal force opposite the direction of insertion.

9. An electrical connector assembly for an automatic transmission as recited in claim 7 wherein said locking means can be removed using a longitudinal force opposite the direction of insertion and a force perpendicular to the direction of insertion.

10. An electrical connector assembly for an automatic transmission having a transmission housing and an oil pan, said connection apparatus including:

an elongated insulating member having contained therein elongated electrical conductors, electrical connectors being connected to said electrical conductors for mating with other components of the transmission;

mounting protrusions extending from said insulating member for engaging the transmission housing and the oil pan so that when the oil pan is coupled to the transmission housing the connector assembly is urged into a desired positioned to provide mechanical mounting and electrical connection;

said mounting protrusions are leg-like protrusions extending from the elongated insulating member and are pressed by the oil pan as installed so as to push on said electrical connectors and make an electrical connection;

a first and a second locking means for coupling said electrical connectors of the electrical connector assembly to an electrical component of the transmission;

an integral support for a temperature sensor;

said mounting protrusion including a longitudinally adjustable end portion;

said longitudinally adjustable end portion is a crushable dome portion;

said first and second locking means being inserted using a longitudinal force in the direction of insertion travel;

said first locking means being removed using a longitudinal force opposite the direction of insertion; and said second locking means being removed using a longitudinal force opposite the direction of insertion and a force perpendicular to the direction of insertion.

11. An electrical connector assembly as recited in claim 10 wherein:

said electrical component includes a solenoid; and an external connection through the transmission housing.

* * * * *